United States Patent
Yamasaki et al.

(10) Patent No.: US 12,074,766 B2
(45) Date of Patent: Aug. 27, 2024

(54) COMMUNICATION CONTROL SYSTEM AND COMMUNICATION CONTROL METHOD

(71) Applicant: TOYOTA JIDOSHA KABUSHIKI KAISHA, Toyota (JP)

(72) Inventors: Yasuhiro Yamasaki, Nisshin (JP); Kunihiro Miyauchi, Toyota (JP); Hideki Goto, Okazaki (JP); Ikuyoshi Otake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/178,651

(22) Filed: Mar. 6, 2023

(65) Prior Publication Data
US 2023/0291650 A1    Sep. 14, 2023

(30) Foreign Application Priority Data

Mar. 10, 2022 (JP) ................. 2022-037512

(51) Int. Cl.
*H04L 41/0859* (2022.01)
*H04L 41/0866* (2022.01)

(52) U.S. Cl.
CPC ...... *H04L 41/0863* (2013.01); *H04L 41/0866* (2013.01)

(58) Field of Classification Search
CPC ........................ H04L 41/0863; H04L 41/0866
See application file for complete search history.

(56) References Cited

U.S. PATENT DOCUMENTS

| | | | |
|---|---|---|---|
| 5,008,814 A * | 4/1991 | Mathur | G06F 8/65 717/172 |
| 6,681,389 B1 * | 1/2004 | Engel | G06F 8/656 717/173 |
| 9,311,066 B1 * | 4/2016 | Garman | G06F 8/65 |
| 9,524,315 B1 * | 12/2016 | Bonham | G06F 21/00 |
| 9,575,738 B1 * | 2/2017 | Chopra | G06F 8/60 |
| 11,356,355 B1 * | 6/2022 | Fisher | H04L 67/1097 |
| 11,726,762 B2 * | 8/2023 | Liu | G06F 8/65 717/172 |
| 11,736,577 B2 * | 8/2023 | Nagamitsu | H04L 67/34 709/203 |
| 2005/0120106 A1 * | 6/2005 | Albertao | H04L 67/34 709/223 |

(Continued)

FOREIGN PATENT DOCUMENTS

JP    2017-169044 A    9/2017

*Primary Examiner* — Douglas B Blair
(74) *Attorney, Agent, or Firm* — Oblon, McClelland, Maier & Neustadt, L.L.P.

(57) ABSTRACT

A communication control system includes a memory and a processor coupled to the memory. The processor is configured to according to an instruction from an external device, perform processing related to changing a network setting on a communication device, after the processing has been executed, determine whether or not communication of the communication device matches a specific communication condition, and notify an error to the external device in a case in which determination has been made that the communication of the communication device does not match the specific communication condition.

17 Claims, 6 Drawing Sheets

(56) References Cited

U.S. PATENT DOCUMENTS

| | | | | |
|---|---|---|---|---|
| 2008/0002669 | A1* | 1/2008 | O'Brien | H04L 12/66 370/352 |
| 2015/0319086 | A1* | 11/2015 | Tripathi | H04L 12/403 370/254 |
| 2017/0279689 | A1* | 9/2017 | Mohan | H04L 69/18 |
| 2019/0372852 | A1* | 12/2019 | Aparicio | H04L 41/0836 |
| 2021/0011705 | A1* | 1/2021 | Liu | H04L 69/40 |
| 2021/0072975 | A1* | 3/2021 | Khafagy | G06F 8/654 |
| 2021/0397430 | A1* | 12/2021 | McFarland, Jr. | H04L 9/3239 |
| 2022/0004375 | A1* | 1/2022 | Satoh | G06F 8/65 |
| 2022/0038426 | A1* | 2/2022 | Zhang | H04L 63/0254 |
| 2022/0182285 | A1* | 6/2022 | Crowder | G06F 11/1433 |
| 2022/0334824 | A1* | 10/2022 | Revadigar | H04L 67/34 |
| 2022/0391191 | A1* | 12/2022 | Cho | H04W 4/44 |
| 2023/0021634 | A1* | 1/2023 | He | H04L 41/20 |
| 2023/0036661 | A1* | 2/2023 | Vladimerou | G06F 8/65 |
| 2023/0076669 | A1* | 3/2023 | Acharya | H04W 4/44 |
| 2023/0179578 | A1* | 6/2023 | Boucadair | H04L 63/0236 726/26 |
| 2023/0236822 | A1* | 7/2023 | Liu | H04L 67/34 717/168 |
| 2023/0280999 | A1* | 9/2023 | Fujii | B60R 16/02 717/171 |

\* cited by examiner

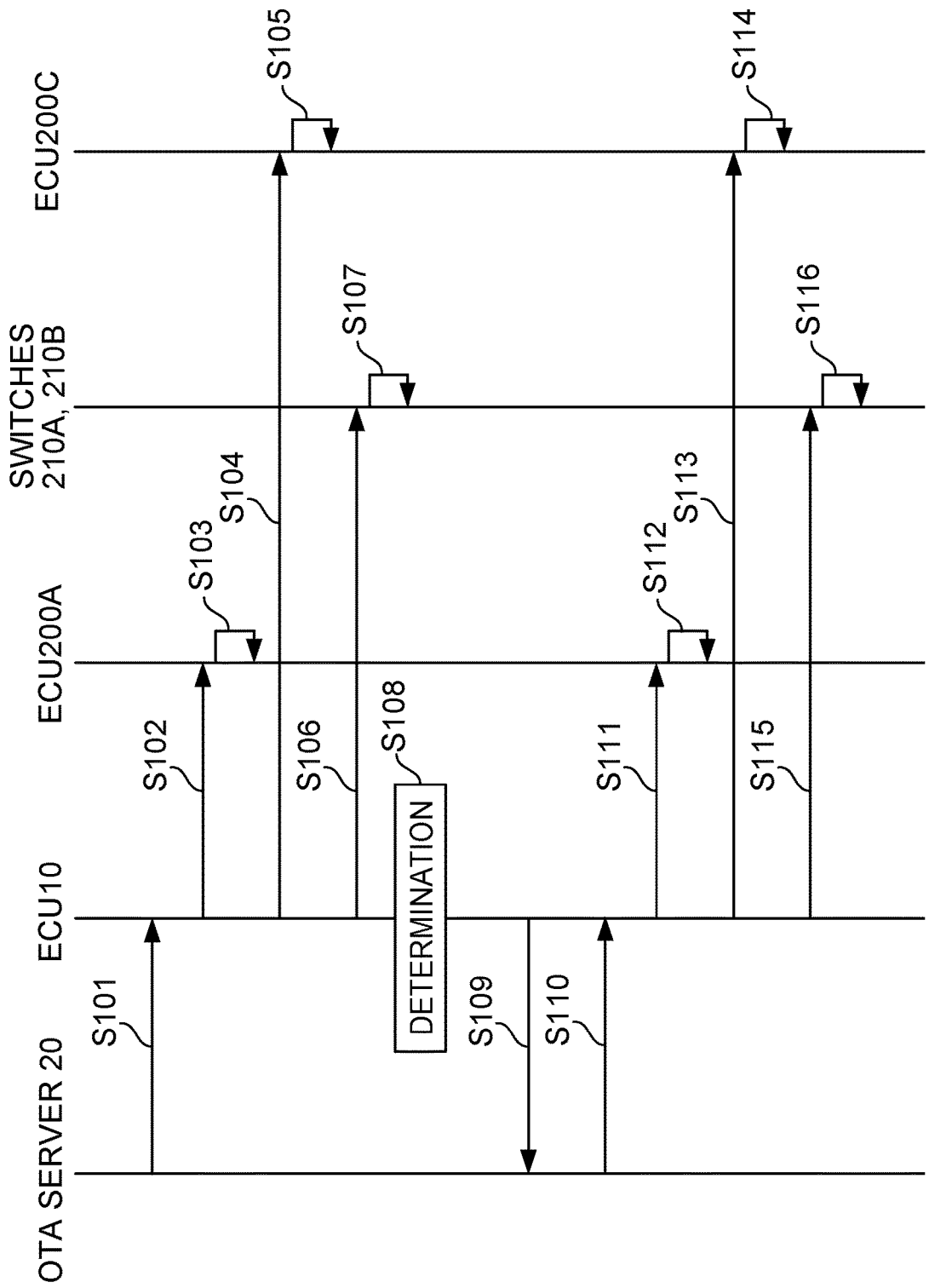

US 12,074,766 B2

COMMUNICATION CONTROL SYSTEM AND COMMUNICATION CONTROL METHOD

CROSS-REFERENCE TO RELATED APPLICATION

This application is based on and claims priority under 35 USC 119 from Japanese Patent Application No. 2022-37512 filed on Mar. 10, 2022, the disclosure of which is incorporated by reference herein.

BACKGROUND

Technical Field

The present disclosure relates to a communication control system, a communication control method, and a non-transitory computer readable recording medium.

Related Art

Use is proliferating of software defined networking (SDN) to change the configuration of a network by software setting, without changing the hardware configuration. For example, a setting device disclosed in JP-A No. 2017-169044 activates a network while also imparting a setting update to a communication device configuring the network.

After the settings of the network have been changed, sometimes a communication device that is connected to the network performs communication that does not match a specific communication condition.

SUMMARY

An aspect of the disclosure is a communication control system including a memory, and a processor coupled to the memory. The processor is configured to according to an instruction from an external device, perform processing related to changing a network setting on a communication device, after the processing has been executed, determine whether or not communication of the communication device matches a specific communication condition, and notify an error to the external device in a case in which determination has been made that the communication of the communication device does not match the specific communication condition.

BRIEF DESCRIPTION OF THE DRAWINGS

Exemplary embodiments of the present disclosure will be described in detail based on the following figures, wherein:

FIG. 6 is a sequence chart to explain an example of operation of each device of a communication system.

DETAILED DESCRIPTION

Figure 1:
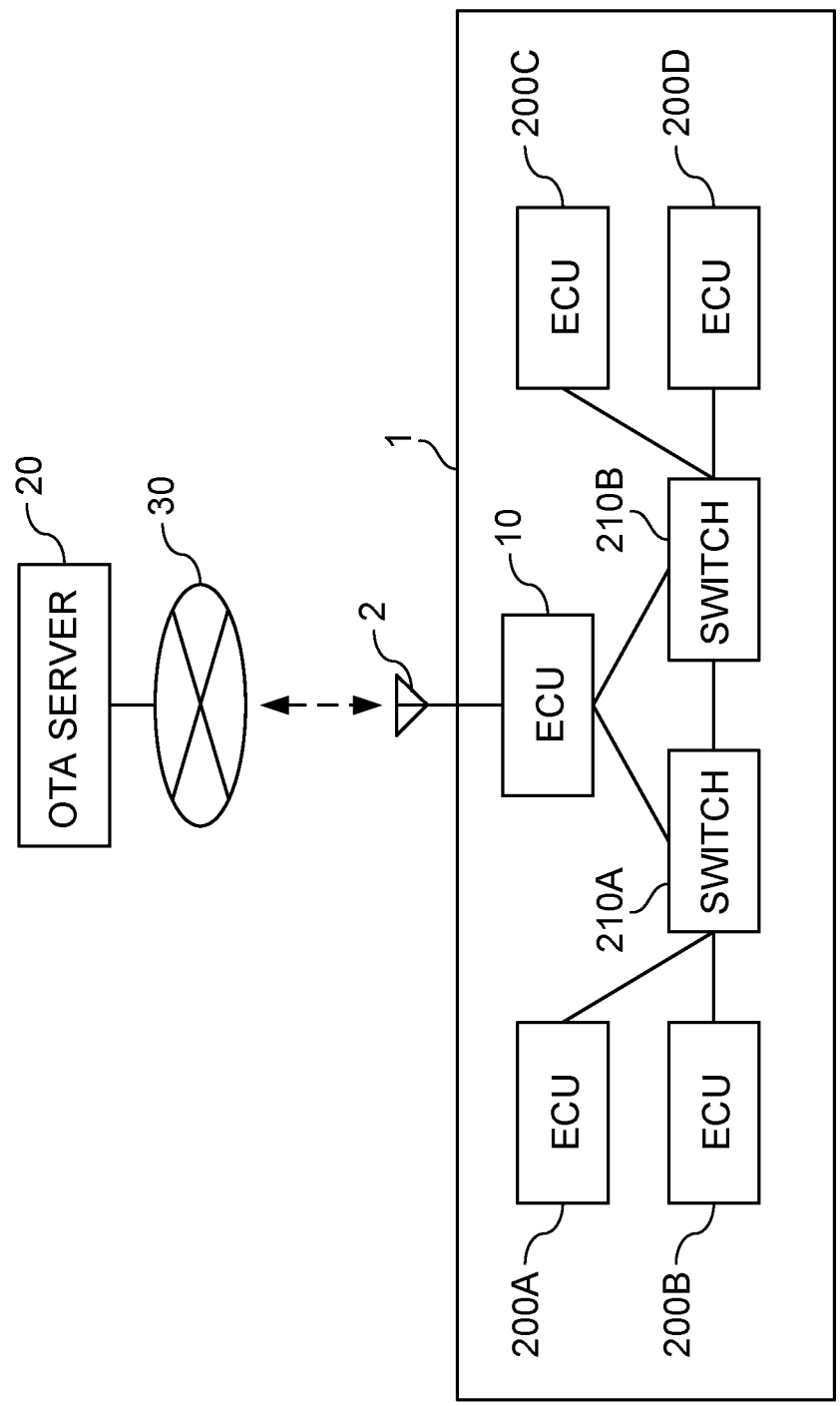
FIG. 1 is a diagram illustrating an example of a schematic configuration of a communication system according to a present exemplary embodiment.

Explanation follows regarding an example of an exemplary embodiment of the present disclosure, with reference to the drawings. Note that the same reference numerals will be appended to the same or equivalent configuration elements and parts in each of the drawings. Sometimes the proportional dimensions in the drawings are exaggerated for explanation purposes and differ from actual proportions.

FIG. 1 is a diagram illustrating an example of a schematic configuration of a communication system according to the present exemplary embodiment. The communication system illustrated in FIG. 1 has a configuration in which a vehicle 1 and an over the air (OTA) server 20 are connected together over a network 30. The vehicle 1 includes an antenna 2, and an onboard network that is an example of a network of the present disclosure and includes electronic control units (ECU) 10, 200A, 200B, 200C, 200D, and switches 210A, 210B. The ECUs 10, 200A, 200B, 200C, 200D and the switches 210A, 210B are connected together by an Ethernet (registered trademark). Note that the numbers of the ECUs and switches are not limited to those of the example illustrated in FIG. 1, and the connection configuration of the ECUs and switches is also not limited to that of the example illustrated in FIG. 1.

The ECU 10 is an ECU to perform overall control of the onboard network. The ECU 10 performs communication with the OTA server 20 using the antenna 2, and exchanges various data with the OTA server 20. The ECUs 200A, 200B, 200C, 200D are each ECUs for controlling respective sections of the vehicle 1. For example, the ECUs 200A, 200B, 200C, 200D control operation of equipment installed to the vehicle 1, such as an engine, a motor, brakes, a camera, lights, and the like.

The ECU 10 changes a configuration of the onboard network by software setting using SDN technology, without changing the hardware configuration of the onboard network. Namely, to change the onboard network configuration, the ECU 10 operates the switches 210A, 210B by software control using OpenFlow or the like, without plugging and unplugging cables or individually setting the individual switches 210A, 210B. More specifically, the ECU 10 sets addresses of packets sent from each ECU to the switches 210A, 210B by software control. The switches 210A, 210B let packets pass or destroy packets based on the content set by the ECU 10.

The OTA server 20, which is an example of an external device, is a server for updating software for each of the ECUs of the vehicle 1. In cases in which an update has been produced for the software stored in each of the ECUs of the vehicle 1, the updated software is transmitted from the OTA server 20 to the vehicle 1. To update the software stored on each of the ECUs of the vehicle 1, the software may be transmitted automatically from the OTA server 20 to the vehicle 1, or the software may be transmitted from the OTA server 20 to the vehicle 1 under instruction from a user onboard the vehicle 1.

When an update has been produced for the software of an ECU connected to the onboard network, sometimes there is an instruction by the updated software to perform new communication with a different ECU of the onboard network. For example, as a result of updating the software on the ECU 200A, sometimes the ECU 200A may be configured to start new communication with the ECU 200C via the switches 210A, 210B. When a software update has been produced for an ECU connected to the onboard network, the ECU 10 changes the communication settings of the switches 210A, 210B.

However, as a result of updating the software, there is a possibility that an ECU 200 may perform communication that does not satisfy a specific communication condition. For example, consider a case in which software is updated such that the ECU 200A starts communication with the ECU 200D, and although the communication settings of the switches 210A, 210B have been changed by the ECU 10, the ECU 200A performs communication with the ECU 200D that is communication not satisfying the specific communication condition.

The specific communication condition referred to here includes communication being performed at a specific cycle, communication being performed with a specific protocol, communication being performed in a specific communication quantity range, communication being performed with a specific service, and the like. More specific examples of the communication condition are described later.

The ECU 10 according to the present exemplary embodiment returns the communication settings of the switches 210A, 210B to their state prior to change in cases in which there is an ECU present that performs communication that does not satisfy the specific communication condition as a result of the communication settings of the switches 210A, 210B being changed by the software. The ECU 10 instructs the OTA server 20 to roll back the software. When there is an ECU present that performs communication that does not satisfy the specific communication condition, the ECU 10 according to the present exemplary embodiment is able to stop this ECU from performing communication that does not satisfy the specific communication condition by returning the communication settings of the switches 210A, 210B to the state prior to change.

Figure 2:
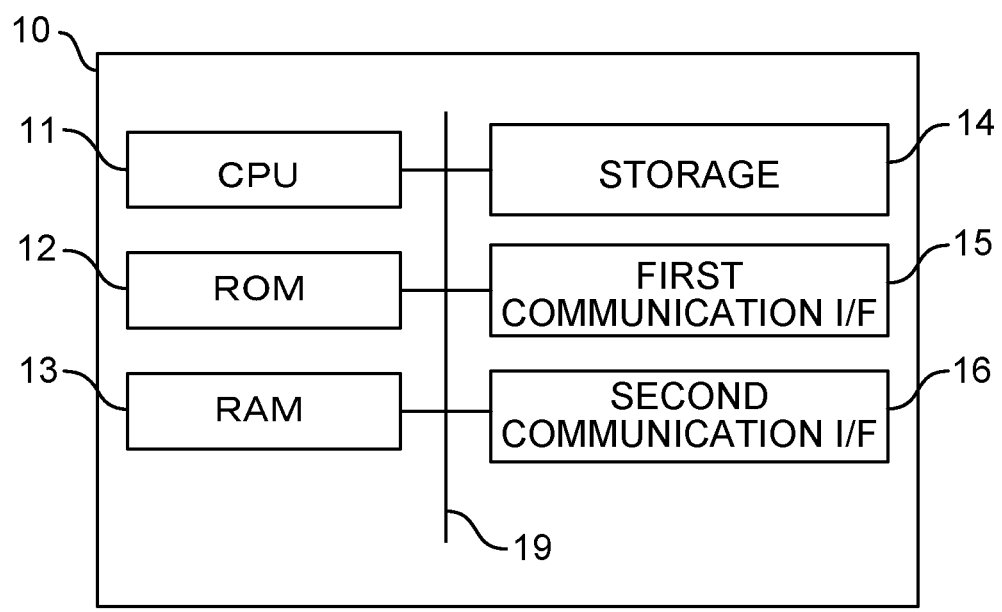
FIG. 2 is a block diagram illustrating an example of a hardware configuration of an ECU.

Explanation follows regarding a hardware configuration of the ECU 10. FIG. 2 is a block diagram illustrating an example of a hardware configuration of the ECU 10.

As illustrated in FIG. 2, the ECU 10 includes a central processing unit (CPU) 11, read only memory (ROM) 12, random access memory (RAM) 13, storage 14, a first communication interface (I/F) 15, and a second communication interface 16. Each configuration element is connected together through a bus 19 so as to enable mutual communication therebetween.

The CPU 11 is an example of a hardware processor, and is a central processing unit that executes various programs and controls each section. Namely, the CPU 11 reads a program from the ROM 12 or the storage 14, which are each an example of a non-transitory recording medium, and executes the program using the RAM 13, which is an example of memory, as a workspace. The CPU 11 performs control of each of the configuration elements described above and performs various computation processing according to the program recorded on the ROM 12 or the storage 14. In the present exemplary embodiment a communication control program for performing communication control of the onboard network of the vehicle 1 is stored on the ROM 12 or the storage 14.

The ROM 12 stores various programs and various data. The RAM 13 serves as workspace for temporarily storing programs or data. The storage 14 is an example of a non-transitory recording medium and is configured by a storage device such as flash memory or the like, and is stored with various programs including an operating system and various data.

The first communication interface 15 is an interface for communicating with the OTA server 20 by employing, for example, a wireless communication standard such as 4G, 5G, or Wi-Fi (registered trademark). The second communication interface 16 is an interface for communicating with other equipment such as the ECUs 200A to 200D by employing, for example, a wired communication standard such as Ethernet (registered trademark).

When the above communication control program is executed, the ECU 10 implements various functions using the above hardware resources. Explanation follows regarding a functional configuration implemented by the ECU 10.

Figure 3:
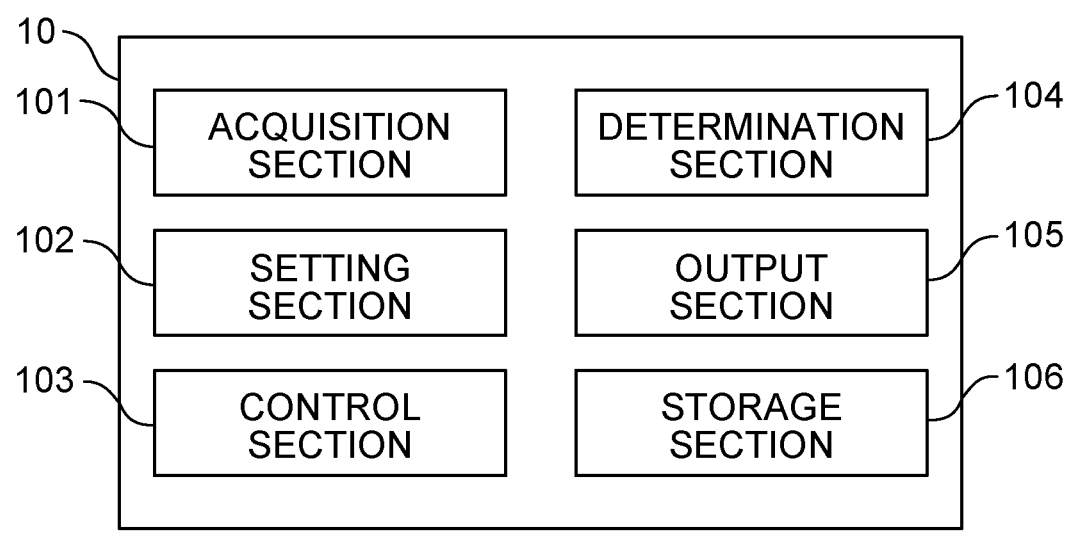
FIG. 3 is a block diagram illustrating an example of a functional configuration of an ECU.

FIG. 3 is a block diagram illustrating an example of a functional configuration of the ECU 10.

As illustrated in FIG. 3, the ECU 10 includes functional configuration of an acquisition section 101, a setting section 102, a control section 103, a determination section 104, an output section 105, and a storage section 106. Each of these functional configuration elements is implemented by the CPU 11 reading the communication control program stored on the ROM 12 or the storage 14 and executing the communication control program. Note that the functions of the acquisition section 101, the setting section 102, the control section 103, the determination section 104, the output section 105, and the storage section 106 may be implemented by plural ECUs.

The acquisition section 101 acquires data from the OTA server 20 and from the ECUs 200A to 200D of the onboard network. More specifically, when an update has been produced for software executed by the ECUs 200A to 200D, the acquisition section 101 acquires the new software from the OTA server 20. Moreover, the acquisition section 101 also acquires data for changing the communication settings of the switches 210A, 210B when needed in response to the software update of the ECUs 200A to 200D.

The setting section 102 performs onboard network communication setting using software. For example, the setting section 102 changes the communication settings of the switches 210A, 210B when needed in response to the software update of the ECUs 200A to 200D. Namely, the setting section 102 changes the onboard network configuration by software setting. Changing the communication settings performed by the setting section 102 is, for example, performed by setting a path so as to enable communication with a communication partner ECU 200, setting to open or close a port, setting to prioritize passage of a packet, setting the size of a packet queue, setting a bandwidth, or setting packet filtering. For example, in cases in which the ECU 200D has been newly added to the onboard network, the setting section 102 might perform setting on the other ECUs 200A to 200C that perform communication with the ECU 200D and perform setting on the switches 210A, 210B to enable communication with the ECU 200D.

The switches 210A, 210B hold the communication settings in a table format, for example. The switches 210A, 210B reference the table for the processing of frames or packets flowing on the onboard network.

The control section 103 controls the operation of the ECU 10 and controls the onboard network. More specifically, the control section 103 performs control to cause the new software acquired by the acquisition section 101 to be output to the output section 105 when an update has been produced for software executed on the ECUs 200A to 200D. When needed in response to the software update of the ECUs 200A to 200D, the control section 103 performs control on the switches 210A, 210B to cause output from the output section 105 of the data needed for communication setting change processing in the setting section 102.

The determination section 104 monitors communication conditions on the onboard network, and determines whether or not communication is being performed that satisfies the specific communication condition. When determined that communication is not being performed so as to satisfy the specific communication condition, the determination section 104 notifies the output section 105 that communication is not being performed so as to satisfy the specific communication condition.

More specifically, the determination section 104 determines whether or not communication by each of the ECUs connected to the onboard network is being performed at a specific cycle. In cases in which the specific cycle is 10 ms, messages should be transmitted at a 10 ms cycle. However, if communication is being performed by communication at 5 ms or 15 ms, by surplus communication outside the 10 ms cycle, by surplus communication generated in addition at the specific cycle, by communication with gaps in the specific cycle, or the like, then the determination section 104 notifies the output section 105 that communication is not being performed at the specific cycle.

The determination section 104 also determines whether or not communication by each of the ECUs connected to the onboard network is being performed with a specific protocol. Then in cases in which TCP communication or ICMP communication is performed by an ECU 200 that only communicates by UDP, an ECU 200 that employs SOME/IP has not used SOME/IP, or the like, the determination section 104 notifies the output section 105 that communication is not being performed with the specific protocol.

The determination section 104 also determines whether or not communication by each of the ECUs connected to the onboard network is being performed in a specific communication quantity range. Then in cases in which the ECU 200 has performed communication exceeding the specific communication quantity range, the determination section 104 notifies the output section 105 that communication is not being performed in the in the specific communication quantity range.

The determination section 104 also determines whether or not the communication by each of the ECUs connected to the onboard network is being performed with a specific service. Consider more specific examples such as when communication by FTP is attempted although TELNET service (port:23) is prohibited for all the ECUs 200 in the vehicle, communication of a particular ECU 200 is with an SOME/IP service id of 0x0002 although the particular ECU 200 should communicate with an SOME/IP service id of 0x0001, communication of a particular ECU 200 is with an SOME/IP method id of 0x0002 although the particular ECU 200 should communicate with a SOME/IP method id of 0x0001, communication in http communication is at 0x0002 although a particular ECU should communicate with a SOME/IP method id of 0x0001, or the like. In such cases the determination section 104 notifies the output section 105 that communication is not being performed with a specific service.

The determination section 104 also determines whether or not communication by each of the ECUs connected to the onboard network is being performed with a specific communication profile. For example, in a case in which a flag for a Partial Network, which is a network in which only some of the ECUs on a single bus are wakeable, should always be 0 (indicating not a bus to be employed for the Partial Network) and yet the flag is set to 1 (indicating a bus to be employed for the Partial Network), the determination section 104 notifies the output section 105 that communication is not being performed with a specific communication profile.

The determination section 104 also determines whether or not communication by each of the ECUs connected to the onboard network is being performed with a specific message. For example, in cases in which permissible MSG IDs of a port A of a given ECU 200 are from 0x0000 to 0x8FFF but this ECU 200 has employed a MSG ID of 0xFFFF, the determination section 104 notifies the output section 105 that communication is not being performed with a specific message.

The determination section 104 also determines whether or not communication by each of the ECUs connected to the onboard network is being performed at a specific data length. For example, in cases in which a data length is always 0x05dc (1500 bytes) but a given ECU 200 is communicating with a data length of 0xffff, or for example, or an http query has a maximum length of 100 bytes but a given ECU 200 is communicating with a query length exceeding this length, the determination section 104 notifies the output section 105 that communication is not being performed with a specific data length.

The determination section 104 also determines whether or not a communication abnormality has occurred in the onboard network. For example, the determination section 104 determines that a communication abnormality has occurred in the onboard network in cases in which an ICMP error is received from the switch 210A. More specifically, for example in cases in which the ECU 200A has transmitted across the switches 210A, 210B to a transmission partner who is not present and a "not present" response has been received from the second stage switch 210B, in such cases the determination section 104 determines that a communication abnormality has occurred in the onboard network.

The determination section 104 also determines whether or not a transmission origin of data transmitted to each of the ECUs connected to the onboard network or the switches is correct. For example, in a case which an IP address of port 1 of the switch 210A should be from 192.168.0.2 to 192.168.0.10 but there is an IP address outside this range, or for example, a case in which a MAC address of port 1 of the switch 210A should be AA:AA:AA:AA:AA:AA but there is a MAC address different thereto, then the determination section 104 notifies the output section 105 that the transmission origin of the data is not correct.

The determination section 104 also determines whether or not a transmission destination of data transmitted from each of the ECUs connected to the onboard network or the switches is correct. For example, in a case in which an address of the transmission destination of data should be a transmission destination IP address of 192.168.0.XXX (wherein XXX is a freely selected number from 0 to 255) but there is an IP address not in this range, the determination section 104 notifies the output section 105 that the transmission destination of the data is not correct.

The determination section 104 also determines whether or not each of the ECUs connected to the onboard network is performing communication at a specific network segment. For example, in a case in which a V ID of a VLAN Tag should be a value of 0x0FF or less but an undefined value has been employed therefor, such as a value other than this has been specified, the determination section 104 notifies the output section 105 that communication is not being performed at a specific network segment.

The determination section 104 also inspects for completeness of communication data transmitted from each of the ECUs connected to the onboard network and determines whether or not the communication data is complete. For example, the determination section 104 inspects the message authentication code (MAC) of communication data transmitted from an ECU added by plug-and-play or by OTA, and notifies the output section 105 that the communication data is not complete if there is an abnormality.

Obviously the content of the determination by the determination section 104 is not limited to the above examples. The content of the determination by the determination section 104 may be added to or modified by distribution of update data from the OTA server 20.

The output section 105 outputs data to the OTA server 20 and to each of the devices in the onboard network. The output of the data from the output section 105 is performed under control from the control section 103. The output section 105 functions as an example of a notification section of the present disclosure. The output section 105 notifies occurrence of an error to the OTA server 20 in cases in which the communication of the ECU 200 has been determined to not satisfy a specific communication condition by the determination section 104.

The storage section 106 stores various information, such as information referenced when operating the ECU 10 and information employed to control the onboard network. More specifically, the storage section 106 is stored with the communication settings prior to change in order to return the communication settings of the switches 210A, 210B to their original state in cases in which the communication of the ECU 200 has been determined by the determination section 104 to not satisfy the specific communication condition after the communication settings of the switches 210A, 210B have been changed.

The control section 103 may determine that a change to the settings of the onboard network is effective in cases in which the determination section 104 has not determined there to be any communication of the ECU 200 not satisfying the specific communication condition for a specific period of time from when the onboard network settings were changed for the switches 210A, 210B. The control section 103 may then notify the OTA server 20 that the change to the onboard network was effective. The OTA server 20 is able to ascertain that the software update has completed normally by acquiring the notification that the change to the onboard network was effective from the vehicle 1.

The ECU 10 includes the configuration illustrated in FIG. 3, and so is able to notify an error to the OTA server 20 in cases in which the determination section 104 has determined that communication of the ECU 200 does not satisfy the specific communication condition. The ECU 10 includes the configuration illustrated in FIG. 3, and so is also able to return the communication settings of the switches 210A, 210B that are the targets of network setting change to the communication settings prior to change in cases in which the determination section 104 has determined that communication of the ECU 200 does not satisfy the specific communication condition. The ECU 10 is accordingly able to achieve a state in which communication not satisfying the specific communication condition does not occur by returning the communication settings of the switches 210A, 210B to the communication settings prior to change.

Figure 4:
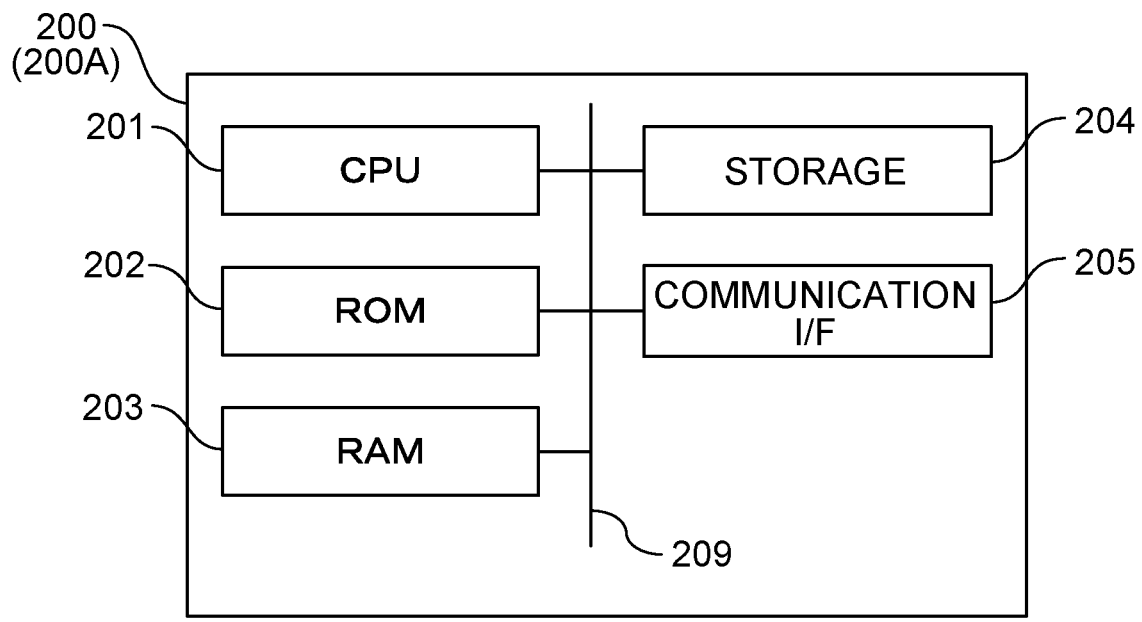
FIG. 4 is a block diagram illustrating an example of a hardware configuration of an ECU.

Explanation next follows regarding a hardware configuration of the ECUs 200A to 200D. In the following the ECUs 200A to 200D are referred to collectively as the ECUs 200. FIG. 4 is a block diagram illustrating a hardware configuration of one of the ECUs 200.

As illustrated in FIG. 4, the ECUs 200 each include a CPU 201, ROM 202, RAM 203, storage 204, and a communication interface (I/F) 205. The configuration elements are connected together through a bus 209 so as to be able to communicate with each other.

The CPU 201 is an example of a hardware processor and is a central processing unit that executes various programs and controls each section. Namely, the CPU 201 reads a program from the ROM 202 or the storage 204, which are each an example of a non-transitory recording medium, and executes the program using the RAM 203, which is an example of memory, as a workspace. The CPU 201 performs control of each of the configuration elements described above and performs various computation processing according to the program recorded on the ROM 202 or the storage 204.

The ROM 202 stores various programs and various data. The RAM 203 is an example of a workspace and temporarily stores programs or data. The storage 204 is configured by a storage device such as flash memory or the like, and is stored with various programs including an operating system and various data.

The communication interface 205 is an interface for communicating with other equipment such as the ECU 10 and other ECUs 200 by employing, for example, a wired communication standard such as Ethernet (registered trademark).

In order to execute the communication control program described above, the ECU 200 uses the above hardware resources to implement various functions. Explanation follows regarding the functional configuration implemented by the ECU 200.

Figure 5:
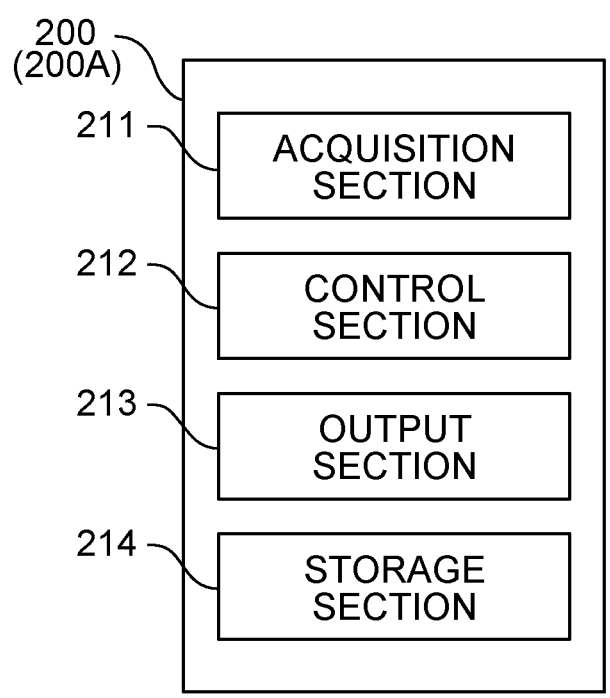
FIG. 5 is a block diagram illustrating an example of a functional configuration of an ECU.

FIG. 5 is a block diagram illustrating an example of a functional configuration of the ECU 200.

As illustrated in FIG. 5, the ECU 200 includes functional configuration of an acquisition section 211, a control section 212, an output section 213, and a storage section 214. Each of these functional configurations is implemented by the CPU 201 reading a program stored on the ROM 202 or the storage 204 and executing the program.

The acquisition section 211 acquires data from the ECU 10 and from other ECUs 200 of the onboard network. More specifically, the acquisition section 211 acquires new software from the ECU 10 when an update of software to be executed by the ECU 200 has been produced.

The control section 212 controls operation of the ECU 200. More specifically, when an update has been produced for the software executed by the ECU 200, the control section 212 performs processing to update the software of the device itself with the new software acquired by the acquisition section 211.

The output section 213 outputs data to the ECU 10 or another ECU 200 of the onboard network. The output of data from the output section 213 is performed under control from the control section 212.

The storage section 214 stores various information such as information for reference during operation of the ECU 10, and information employed to control the onboard network. More specifically, the storage section 214 stores software executed in the ECU 200 and data for reference by the software.

Next, description follows regarding operation of the communication system.

FIG. 6 is a sequence chart to explain an example of operation of each device of the communication system. In the ECU 10, the CPU 11 reads a communication control program from the ROM 12 or the storage 14, expands the program in the RAM 13, and executes the program so as to perform the communication control processing.

The sequence chart illustrated in FIG. 6 illustrates operation of each device for a case in which the software executed in the onboard network ECU 200 is updated, and the communication settings of the switches 210A, 210B are changed according to the software update. FIG. 6 is a sequence chart that envisages a case in which, prior to software update, communication between the ECU 200A and the ECU 200C is started by the communication settings of the switches 210A, 210B.

When updating the software executed by the onboard network ECU 200, first the OTA server 20 transmits the software data to the vehicle 1 at step S101. The software data transmitted from the OTA server 20 is first acquired by the ECU 10. The ECU 10 outputs the software data acquired from the OTA server 20 to the update target ECU(s) 200. In this case the ECUs 200A, 200B are the software update targets. At step S102 and step S104, the ECU 10 outputs the software data to the software update targets ECUs 200A, 200C. At step S103, the ECU 200A updates the software using the software data arriving from the ECU 10. Similarly, at step S105 the ECU 200C updates the software using the software data arriving from the ECU 10.

In order to update the communication settings of the switches 210A, 210B according to the software update, at step S106 the ECU 10 outputs new communication setting information. At step S107, the switches 210A, 210B use the communication setting information arriving from the ECU 10, and reflect this communication setting information in the communication settings. For example, by updating the software of the ECUs 200A, 200C, the ECU 10 updates the communication settings of the switches 210A, 210B so as to enable communication between the ECU 200A and the ECU 200C.

When the software update and the communication setting changes have been completed, at step S108 the ECU 10 monitors the content of communication on the onboard network, and determines whether or not the communication from the ECUs 200 matches the specific communication condition.

When determined that communication from the ECU 200 does not match the specific communication condition, at step S109 the ECU 10 transmits to the OTA server 20 a notification that a communication error has occurred as a result of updating the software on the ECUs 200A, 200C and changing the communication settings of the switches 210A, 210B.

The OTA server 20 that has received notification of communication error occurrence then, at step S110, transmits a rollback instruction to the vehicle 1. The roll back referred to is a return to the software prior to update. When sent the rollback instruction from the OTA server 20, the ECUs 200A, 200C use the software data being held prior to update to return the software to the state prior to update.

On receipt of the rollback instruction from the OTA server 20, the ECU 10 outputs a rollback instruction to the rollback target ECUs 200. In this example the ECUs 200A, 200C are the software rollback targets. At step S111 and step S113, the ECU 10 outputs a rollback instruction to the software rollback targets ECUs 200A, 200C. At step S112, the ECU 200A rolls back the software according to the instruction from the ECU 10. Similarly, at step S114, the ECU 200C rolls back the software according to the instruction from the ECU 10. Moreover, as well as the software rollback, at step S115 the ECU 10 also instructs the switches 210A, 210B so as to return their communication settings to the state prior to changing. At step S116 the communication settings of the switches 210A, 210B are returned to their state prior to change.

On receiving a communication error occurrence notification from the ECU 10, the OTA server 20 re-transmits software, modified based on the content of communication error such that the communication error does not occur, to the vehicle 1. The distribution target for the modified software is not limited to being the ECUs 200A, 200C, and may include the ECU 200D not related to the communication error. The flow of processing from transmitting the software from the OTA server 20 to updating the software in the ECUs 200 is similar to that described above from step S101 to step S105, and so detailed explanation thereof will be omitted. The ECU 10 also executes processing to update the communication settings of the switches 210A, 210B according to the updated software.

As explained above, according to the exemplary embodiment of the present disclosure, the communication settings of the setting change target switches of the network can be returned to their state prior to change in cases in which an ECU causes a communication error after the network setting change. The ECU 10 is thereby able to achieve a state such that the ECU does not cause a communication error by returning the communication settings of the setting change target switches of the network to their state prior to change.

Although in the exemplary embodiment described above a case has been illustrated in which the OTA server 20 distributes software, in cases in which the OTA server 20 does not distribute software, when the ECU 10 has acquired a notification of a communication abnormality detection from an ECU 200, the onboard network ECU 10 executes processing to return the communication settings for the switches 210A, 210B to their state prior to change.

The present disclosure is also applicable to a case in which a new ECU is connected to an onboard network, and communication settings are changed to enable communication between the newly connected ECU and other ECUs. Moreover, although the example illustrated in the above exemplary embodiment was related to changing communication settings on an onboard network that is a network built up in a vehicle, the present disclosure is not limited to such an example. The present disclosure is also applicable to networks in general that have a configuration changed by software setting.

Note that the communication control processing executed by a CPU reading and executing software (a program) in the above exemplary embodiment, the communication control processing may be executed by various processors other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The communication control processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, although in the above exemplary embodiment an embodiment was described in which a program for communication control processing was pre-stored (installed) on the ROM or the storage, there is no limitation thereto. The program may be provided in a format recorded on a non-transitory recording medium such as a compact disk read only memory (CD-ROM), digital versatile disk read only memory (DVD-ROM), universal serial bus (USB)

memory, or the like. Moreover, the program may be provided in a format downloadable from an external device over a network.

In consideration of the above circumstances, an object of the present disclosure is to provide a communication control system to notify that communication not matching a communication condition has been performed in cases in which, after a setting of a network has been changed, a communication device connected to the network has performed communication not matching the specific communication condition, and to provide a communication control method and non-transitory computer readable recording medium of the same.

A first aspect of the disclosure is a communication control system including a memory, and a processor coupled to the memory. The processor is configured to according to an instruction from an external device, perform processing related to changing a network setting on a communication device, after the processing has been executed, determine whether or not communication of the communication device matches a specific communication condition, and notify an error to the external device in a case in which determination has been made that the communication of the communication device does not match the specific communication condition.

The first aspect of the present disclosure enables notification to the external device that communication not matching the communication condition has been performed in cases in which, after the network setting has been changed, the communication device connected to the network has performed communication not matching the specific communication condition.

A second aspect of the disclosure is a communication control system including a memory, and a processor coupled to the memory. The processor is configured to according to an instruction from an external device, perform processing related to changing a network setting on a communication device, after the processing has been executed, determine whether or not communication of the communication device matches a specific communication condition, and return the network setting to a prior state, in a case in which determination has been made that the communication of the communication device does not match the specific communication condition.

The second aspect of the present disclosure enables the network setting to be returned to the state prior to change in cases in which, after the network setting has been changed, the communication device connected to the network has performed communication not matching the specific communication condition.

A third aspect of the disclosure is the communication control system of the first aspect, wherein the processor is further configured to return the network setting to a prior state, in a case in which determination has been made that the communication of the communication device does not match the specific communication condition.

The third aspect of the present disclosure enables the network setting to be returned to the state prior to change in cases in which, after the network setting has been changed, the communication device connected to the network has performed communication not matching the specific communication condition.

A fourth aspect of the disclosure is the communication control system of the first aspect, wherein the processor is further configured to determine whether or not the communication by the communication device is being performed at a specific cycle. The fourth aspect of the present disclosure enables notification to the external device of the occurrence of communication not being performed at the specific cycle.

A fifth aspect of the disclosure is the communication control system of the first aspect, wherein the processor is further configured to determine whether or not the communication by the communication device is being performed with a specific protocol. The fifth aspect of the present disclosure enables notification to the external device of the occurrence of communication not being performed with a specific protocol.

A sixth aspect of the disclosure is the communication control system of the first aspect, wherein the processor is further configured to determine whether or not the communication by the communication device is being performed in a specific communication quantity range. The sixth aspect of the present disclosure enables notification to the external device of the occurrence of communication not being performed in a specific communication quantity range.

A seventh aspect of the disclosure is the communication control system of the first aspect, wherein the processor is further configured to determine whether or not the communication by the communication device is being performed with a specific service. The seventh aspect of the present disclosure enables notification to the external device that communication is not being performed with a specific service.

An eighth aspect of the disclosure is the communication control system of the first aspect, wherein the processor is further configured to determine whether or not the communication by the communication device is being performed with a specific communication profile. The eighth aspect of the present disclosure enables notification to the external device that communication is not being performed with a specific communication profile.

A ninth aspect of the disclosure is the communication control system of the first aspect, wherein the processor is further configured to determine whether or not the communication by the communication device is being performed with a specific message. The ninth aspect of the present disclosure enables notification to the external device that communication is not being performed with a specific message.

A tenth aspect of the disclosure is the communication control system of the first aspect, wherein the processor is further configured to determine whether or not the communication by the communication device is being performed at a specific data length. The tenth aspect of the present disclosure enables notification to the external device that communication is not being performed with a specific data length.

An eleventh aspect of the disclosure is the communication control system of the first aspect, wherein the processor is further configured to determine whether or not a communication abnormality is being generated in the network. The eleventh aspect of the present disclosure enables notification to the external device of the occurrence of a communication abnormality on the network.

A twelfth aspect of the disclosure is the communication control system of the first aspect, wherein the processor is further configured to determine whether or not information relating to a transmission origin communication device is correct. The twelfth aspect of the present disclosure enables notification to the external device of the occurrence of a communication for which the information of the transmission origin communication device is not correct.

A thirteenth aspect of the disclosure is the communication control system of the first aspect, wherein the processor is further configured to determine whether or not information relating to a transmission destination communication device is correct. The thirteenth aspect of the present disclosure enables notification to the external device of the occurrence of a communication for which the information of the transmission destination communication device is not correct.

A fourteenth aspect of the disclosure is the communication control system of the first aspect, wherein the processor is further configured to determine whether or not the communication is being performed at a specific network segment. The fourteenth aspect of the present disclosure enables notification to the external device of the occurrence of communication not being performed at a specific network segment.

A fifteenth aspect of the disclosure is the communication control system of the first aspect, wherein the processor is further configured to inspect completeness of communication data transmitted from the communication device, and to determine whether or not the communication data is complete. The fifteenth aspect of the present disclosure enables notification to the external device of the occurrence of communication with incomplete communication data.

A sixteenth aspect of the disclosure is the communication control system of the first aspect, wherein the processor is further configured to notify the external device that a network setting change is effective in a case in which a determination that the communication of the communication device does not match the specific communication condition has not been made for a specific period of time from the network setting change. The sixteenth aspect of the present disclosure enables notification to the external device that the network setting change is effective as long as communication not matching the specific communication condition has not been generated during the specific period of time.

A seventeenth aspect of the disclosure is the communication control system of the first aspect, wherein the network is an onboard network. The seventeenth aspect of the present disclosure enables the network setting to be returned to the state prior to change in cases in which a communication abnormality occurs in a communication device connected to the onboard network.

An eighteenth aspect of the disclosure is a communication control method including a processor executing processing comprising according to an instruction from an external device, performing processing related to changing a network setting on a communication device, after the processing has been executed, determining whether or not communication of the communication device matches a specific communication condition, and notifying an error to the external device in a case in which determination has been made that the communication of the communication device does not match the specific communication condition.

The eighteenth aspect of the present disclosure enables notification to the external device that communication not matching the communication condition has been performed in cases in which, after the network setting has been changed, the communication device connected to the network has performed communication not matching the specific communication condition.

A nineteenth aspect of the disclosure is a non-transitory recording medium storing a program that is executable by a computer to perform processing. The processing includes according to an instruction from an external device, performing processing related to changing a network setting on a communication device, after the processing has been executed, determining whether or not communication of the communication device matches a specific communication condition, and notifying an error to the external device in a case in which determination has been made that the communication of the communication device does not match the specific communication condition.

The nineteenth aspect of the present disclosure enables notification to the external device that communication not matching the communication condition has been performed in cases in which, after the network setting has been changed, the communication device connected to the network has performed communication not matching the specific communication condition.

The present disclosure is thereby able to provide a communication control system to notify that communication not matching a communication condition has been performed in cases in which, after a setting of a network has been changed, a communication device connected to the network has performed communication not matching the specific communication condition, and to provide a communication control method and non-transitory computer readable recording medium of the same.

What is claimed is:

1. A communication control system, comprising:
a control unit installed in a vehicle, wherein the control unit includes:
   a memory; and
   a processor coupled to the memory, the processor, by virtue of executing instructions stored on the memory, being configured to:
      update software of an electronic control unit (ECU) connected to a network of the vehicle to be updated;
      cause a relay device on the network to change a network setting of the network according to the update of the software, wherein the update is caused according to an instruction from an external device located outside the vehicle:
      after causing the relay device to change the network setting, determine whether or not communication of the ECU with the software that has been updated within the network in which the network setting has been changed matches a specific communication condition; and
      notify an error to the external device based on a determination having been made that the communication of the ECU with the software that has been updated does not match the specific communication condition.

2. The communication control system of claim 1, wherein the processor is, by virtue of executing the instructions, further configured to cause the network setting to return to a prior state in a case where the determination having been made that the communication of the ECU with the software that has been updated does not match the specific communication condition.

3. The communication control system of claim 1, wherein the specific communication condition includes the communication by the ECU with the software that has been updated being performed at a specific cycle.

4. The communication control system of claim 1, wherein the specific communication condition includes the communication by the ECU with the software that has been updated being performed with a specific protocol.

5. The communication control system of claim 1, wherein the specific communication condition includes the communication by the ECU with the software that has been updated being performed in a specific communication quantity range.

6. The communication control system of claim 1, wherein the specific communication condition includes the communication by the ECU with the software that has been updated being performed with a specific service.

7. The communication control system of claim 1, wherein the specific communication condition includes the communication by the ECU with the software that has been updated being performed with a specific communication profile.

8. The communication control system of claim 1, wherein the specific communication condition includes the communication by the ECU with the software that has been updated being performed with a specific message.

9. The communication control system of claim 1, wherein the specific communication condition includes the communication by the ECU with the software that has been updated being performed at a specific data length.

10. The communication control system of claim 1, wherein the processor is, by virtue of executing the instructions, further configured to determine whether or not a communication abnormality is being generated in the network.

11. The communication control system of claim 1, wherein the processor is, by virtue of executing the instructions, further configured to determine whether or not information relating to a transmission origin is correct.

12. The communication control system of claim 1, wherein the processor is, by virtue of executing the instructions, further configured to determine whether or not information relating to a transmission destination is correct.

13. The communication control system of claim 1, wherein the specific communication condition includes the communication by the ECU with the software that has been updated being performed at a specific network segment.

14. The communication control system of claim 1, wherein the processor is, by virtue of executing the instructions, further configured to:
inspect completeness of communication data transmitted from the ECU with the software that has been updated, and
determine whether or not the communication data is complete.

15. The communication control system of claim 1, wherein the processor is, by virtue of executing the instructions, further configured to notify the external device that the change of the network setting is effective in a case in which a determination that the communication of the ECU with the software that has been updated does not match the specific communication condition has not been made for a specific period of time from the change of the network setting.

16. A communication control system, comprising:
a control unit installed in a vehicle, wherein the control unit includes:
a memory; and
a processor coupled to the memory, the processor, by virtue of executing instructions stored on the memory, being configured to:
update software of an electronic control unit (ECU) connected to a network of the vehicle to be updated;
cause a relay device on the network to change a network setting of the network according to the update of the software, wherein the update is caused according to an instruction from an external device located outside the vehicle;
after causing the relay device to change the network setting, determine whether or not communication of the ECU with the software that has been updated within the network in which the network setting has been changed matches a specific communication condition; and
cause the network setting and the software of the ECU to return to a prior state in a case where a determination having been made that the communication of the ECU with the software that has been updated does not match the specific communication condition.

17. A communication control method implemented by a processor installed in a vehicle executing instructions, the method comprising:
updating software of an electronic control unit (ECU) connected to a network of the vehicle to be updated;
causing a relay device on the network to change a network setting of the network according to the update of the software, wherein the update is caused according to an instruction from an external device located outside the vehicle;
after causing the relay device to change the network setting, determining whether or not communication of the ECU with the software that has been updated within the network in which the network setting has been changed matches a specific communication condition; and
notifying an error to the external device based on a determination having been made that the communication of the ECU with the software that has been updated does not match the specific communication condition.

* * * * *